Feb. 11, 1969    J. U. LEHN    3,426,471
ANIMAL TRAPS
Filed June 21, 1967

INVENTOR,
J. U. LEHN
BY Jacobi & Davidson
ATTORNEYS

United States Patent Office 3,426,471
Patented Feb. 11, 1969

3,426,471
ANIMAL TRAPS
John U. Lehn, Lititz, Pa., assignor to Woodstream Corporation, Lititz, Pa., a corporation of Pennsylvania
Filed June 21, 1967, Ser. No. 647,650
U.S. Cl. 43—92     10 Claims
Int. Cl. A01m 23/28

ABSTRACT OF THE DISCLOSURE

A trap having pivotally connected similar frames and spring means for swinging the frames relative to each other from a set position to a closed position. A downwardly swinging gravity assisted latch in the form of an arm pivotally mounted on a portion of one of the frames and having one or more upwardly opening notches spaced therealong to receive the underside of a corresponding portion of the other frame in a selected one of the notches to hold the frames in a set position. The downwardly swinging gravity assisted latch is triggered by a trigger member pivotally mounted on the corresponding portion of the other frame and having surfaces engaging the latch in such a manner that it will release the latch and thereby let the frames move to a closed position under the action of the spring means.

---

This invention relates to improvements in traps and particularly traps for catching animals. In trapping fur-bearing and other animals, a trapper usualy has a "line" which may consist of several dozen traps. As the traps are frequently set in places that are accessible only by foot, a trapper must frequently carry quite a number of traps with him at one time. It is therefore desirable for the traps to be as light and compact as possible to ease the burden of carrying them. It is also important for the traps to be of simple and inexpensive construction so that a trapper can afford to own a large number of traps.

These desirable characteristics have been embodied to a greater or lesser extent in some prior art traps, some of which rely on the force supplied by a spring to close the trap when they are tripped. The spring force not only closes the traps, but in prior constructions, causes the locking member to swing upwardly to release the trap frames. The trap of this invention, on the other hand, relies on the force of gravity to swing the released locking member downwardly, and out of the way of the closing trap frames once the frames are released.

Further, the trap of this invention is of the type comprising two similar frames pivotally connected and spring means for swinging the frames relative to each other, but consistent herewith there is a gravity sensitive locking or latch member, and a trigger member which, in a preferred embodiment, includes an elongate slot through which the latch member is inserted when setting the trap. The elongate slot enables the operator to easily set the trap and provides convenience in handling the trap while setting and placing the same.

Furthermore, the traps of this invention while facilitating initial latching and providing for downward, and thereby gravity aided release, still operate satisfactorily even under adverse conditions. Moreover, even though latch release is gravity assisted, they can be set to release under different tripping pressures so that the sensitivity of the traps can be varied to suit the particular game for which they are being used and the position and environment of the traps, or they can be made so that they will only release under one predetermined tripping pressure in order to use a trap of standardized sensitivity for use in trapping particular game.

The primary object of the invention is therefore to provide an animal trap of the type specified above wherein latch release is gravity assisted and in a preferred embodiment, the latch setting is eased by what might be deemed a slot guide. To this end, it is a specific object of this invention to provide an improved animal trap having a latch member which locks the trap in a set position from below and opens downwardly by the force of gravity when released by a trigger member which preferably contains an elongate slot to accommodate the latch member. Additionally, it is a specific object hereof to provide an improved animal trap in conformance with the foregoing objects and further has trigger legs affixed to said trigger member and is adjustable by varying the configuration of the slot.

The invention will be better understood and objects other than those set forth above will become apparent after considering the following description. Such description refers to the annexed drawings presenting preferred and illustrative embodiments of the invention, and wherein.

Figure 6:
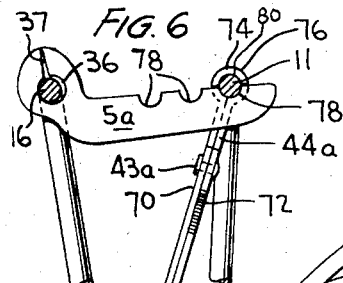
FIGURE 6 is a fragmentary sectional view of the trigger mechanism of FIGURE 5 as shown in the set position with the latch.

The trap shown by way of example in the drawings comprises two jaws 1 and 2 pivotally connected with one another by pivots 3, a spring 4 for actuating the jaws, a latch 5 for holding the jaws in set position and a trigger 6 for releasing the jaws. An anchor chain 7 is shown attached to the spring 4.

The jaws 1 and 2 are similar to one another and are in the form of hollow frames, each having opposite side portions and connecting end portions. Thus, the jaw 1 is shown as comprising side portions 11 and 12 and end portions 13 and 14. The other jaw 2 is shown as having side portions 15 and 16 and end portions 17 and 18. The jaws are conveniently made of strip or wire stock bent to provide the desired shape. For convenience and economy of manufacture, each of the jaws is shown as being made up of two halves which are brazed or welded together. Thus, the jaw 1 is shown as having one half comprising the side portion 11, an end portion 13a and an opposite end portion 14a and a second half comprising the side portion 12, an end portion 13b and an opposite end portion 14b. The end portion 13a of the first half is formed to provide a loop portion or eye 20 while the end portion 14b of the second half is similarly formed to provide a loop or eye 21. The end portion 13b of the second half is welded to the periphery of the eye 20 while the end portion 14a of the first half is welded to the eye 21, thereby joining the two halves together into an integral frame. As will be clearly seen in FIGURE 1, the end portions 13a and 13b of the jaw 1 are bent at obtuse angles so as to provide short portions 13c, 13d which project approximately radially from the eye 20 in approximately diametrical alignment with one another while remaining portions 13a and 13b are approximately equal to the diameter of the eye 20. The opposite end portions 14a and 14b of the jaw 1 are similarly formed.

The other jaw 2 is similar to jaw 1 and of approximately the same width but is slightly shorter so that the end portions 17 and 18 of jaw 2 fit snugly inside the end portions 13 and 14 of jaw 1. Jaw 2 is similarly formed of two halves of which one comprises the side portion 15 and opposite end portions 17a and 18a while the other comprises the side portion 16 and opposite end portions 17b and 18b. Opposite end portions of jaw 2 are provided with eyes 22 and 23 which fit axially inside and in alignment with the eyes 20 and 21 of jaw 1. The eyes are located approximately midway between the opposite sides of the respective jaws. The end portions 17a and 17b have angular portions 17c and 17d adjacent the eye 22. The opposite end portions 18a and 18b are similarly formed, the jaw being reversible.

The pivotal connections 3 between the jaws 1 and 2 are shown as comprising a pivot pin or shaft extending through aligned eyes 20 and 22 of the jaws and a second pivot pin or shaft extending through aligned eyes 21 and 23. For convenience and economy of manufacture, the pivot pins 3 are shown as comprising hollow rivets, each having a head portion 25 at one end and a flanged portion 26 at the opposite end formed by a suitable pivoting operation after the rivet is inserted through the aligned eyes. With the pivotal connections provided by the pivots 3, the jaws 1 and 2 are swingable between the sprung or released position shown in FIGURE 1, in which the side portion 11 of the jaw 1 is adjacent the side portion 15 of jaw 2, and the set position shown in FIGURE 2, in which the side portion 11 of jaw 1 is adjacent the side portion 16 of jaw 2.

The spring 4 is shown as comprising a spiral portion 30 consisting of one or more loops and end portions providing arms 31 and 32. An eye or loop 33 formed at the end of the spring arm 31 encircles end portions 13a and 17a of the jaws 1 and 2 while an eye or loop 34 formed at the end of the spring arm 32 encircles end portions 13b and 17b of the jaws. When the jaws are swung from the released position shown in FIGURE 1 to the set position shown in FIGURE 2 the loop portions 33 and 34 are forced inwardly toward the pivot 3 so as to encircle the end portions 13c, 17c and 13d and 17d adjacent the pivot eyes 20 and 22 of the jaws.

Figure 1:
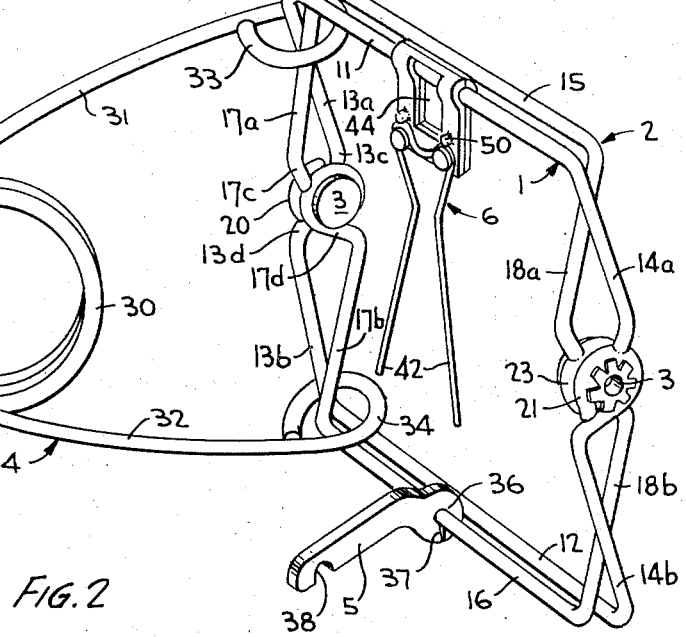
FIGURE 1 is a perspective view of a trap in accordance with a preferred embodiment of the invention in sprung or released position.
Figure 2:
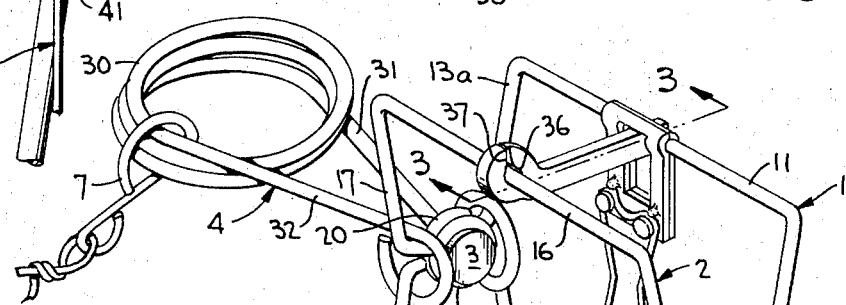
FIGURE 2 is a perspective view of the trap in set position.

The inherent resiliency of the spring tends to swing the spring arms 31 and 32 apart, thereby forcibly pivoting the jaws 1 and 2 from the position shown in FIGURE 2 toward that shown in FIGURE 1. Although the force exerted by the springs is at a maximum when the trap is is in set position (FIG. 2), the jaws can readily be held in this position since the spring acts on the jaws near the pivot and hence with a short lever arm. As the loops 33 and 34 move outwardly on the end portions of the jaws, the effective lever arm is increased and moreover there is wedging action by reason of the angular relation of the end portions of the jaws so that the jaws are urged forcibly toward one another and securely hold an animal caught between them. A similar spring may be provided if desired at the opposite ends of the jaws.

The jaws are releasably held in set position by means of the catch or latch 5 which is shown as comprising a small latch member pivotally mounted on the side portion 16 of the jaw 2. In the preferred form shown in the drawings, the latch member comprises a bar 35 having a substantially straight portion 35a and an inner end portion 35b disposed at an obtuse angle to the portion 35a and provided with a opening 36 that receives the side portion of the jaw. For economy of manufacture, a cut or slot 37 opens into the hole 36 so that portions of the member on opposite sides of the slot 37 can be spread apart to slip on over the jaw and then pressed back together to retain the latch in place. When assembled on the jaw, the latch is rotatable about the side portion of the jaw as a pivot and is also slidable longitudinally of the jaw. On its outer edge, i.e. the edge facing outwardly away from the pivotal axis of the trap when in set position (FIG. 2), the latch bar 35 is provided with one or more notches 38 of a size to fit over the side portion of the opposite jaw. When the jaws are formed of round wire, the depth of the notches 38 should be slightly greater than the radius of the wire so that the latch will not slip off the jaw 1 when the trap is in set position. When several notches are provided, they may, if desired be of different depths.

Figure 3:
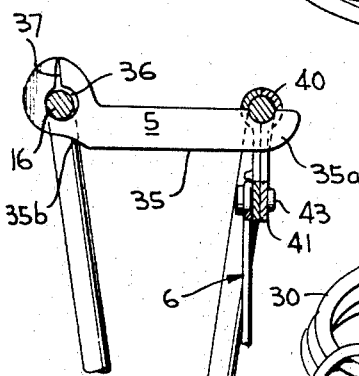
FIGURE 3 is a fragmentary sectional view taken approximately on the line 3—3 in FIGURE 2 and illustrating a preferred embodiment of the improved latch and trigger mechanism of the trap.

The trigger 6 is rotatable on the jaw engaged by the latch 5 and is adapted, when actuated in either direction to push the latch off so as to disengage it from the jaw. As shown in FIGURES 1, 2, and 3, the trigger comprises a sleeve portion 40 which fits around the side portion 11 of the jaw 1 and a flat portion 41 projecting radially from the sleeve portion. A two-pronged trigger arm 42 is secured to the flat portion 41 and when the trap is in set position projects inwardly so as to lie approximately in a plane between the jaws. For convenience of manufacture and assembly, the sleeve portion 40 and flat portion 41 are formed of two small stamped plates fastened together as by rivets or the like and the trigger arm 42 comprises a bent wire which is fixed to the flat portion 41 by the same fastening means or rivets 43. Two projections 50 are provided on the flat portion 41 spaced above the rivets 43 at a distance approximately equal to the thickness of the wire of the trigger arm 42 to lock the trigger arm 42 in place and prevent it from slipping off the flat portion 41. In the flat portion 41 there is provided an elongated slot 44 which is sufficiently deep to allow insertion of the latch 5 and which extends into the sleeve portion 40 to a depth slightly greater than the radius of the sleeve so as to allow the latch member to engage a portion of the jaw 1 exposed by the slot as illustrated in FIGURES 2 and 3. When the trigger is swung in either direction from the position shown in FIGURE 2, one or the other of the bottom edges of the slot 44 in the sleeve portion 40 engages the latch 5 and pushes it slightly outwardly so as to disengage the latch from the jaw. The latch member 5 as shown with only one notch 38 will allow the jaws to open to a fixed distance, providing a constant spring pressure. By locating the notch 38 at a predetermined distance from the jaw 2 on which the latch is pivotally mounted the said spring pressure will be predetermined at the factory. By providing the latch member 5 with several notches located at different distances from the jaw 2 on which the latch is pivotally mounted, the amount the jaws are open and hence the spring pressure acting on the jaws can be varied as desired. This in turn varies the force required to disengage the latch from the opposite jaw and hence provides selectivity in the sensitivity and speed of action of the trap.

Figure 4:
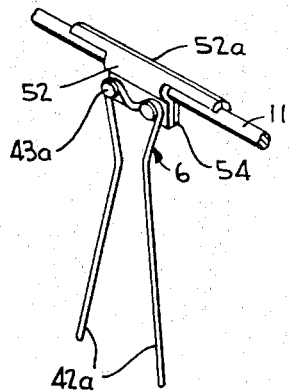
FIGURE 4 is a perspective view of a trigger mechanism in accordance with a second embodiment of the invention.

In another embodiment of this invention, as shown in FIGURE 4, the trigger 6 comprises a sleeve portion 52 which fits around the side portion of the jaw 1 and a flat portion 54 projecting radially from the sleeve portion. A two-pronged trigger arm 42a is secured to the flat portion 54 by fastening means, preferably by rivets 43a in the same manner the trigger arm 42 is secured to the flat portion 41 in the preferred embodiment of FIGURES 1, 2, and 3. The flat portion 54 extends a sufficient distance to enable placement of the rivets 43a holding the trigger arm 42a and the two small stamped plates which form the sleeve portion 52 and the flat portion 54 together. The sleeve portion 52 extends axially along the top of the side portion 11 of the jaw 1 for a distance greater than the thickness of said latch member 5 and is cut away along the underside of the side portion of the jaw 1 to a depth slightly greater than the radius of the sleeve. In practice with this embodiment the catch or latch 5 is swung around to engage the underside of the side portion 11 of the jaw 1 in one of its notches 38 immediately below one of the axial extensions of the sleeve portion 52. The axial extension of said sleeve portion 52 will then engage the latch member 5 to release the side portion 11 of the jaw 1 from the notch 38 and thereby allow the latch member 5 to swing downwardly and spring the trap. With respect to FIGURE 4, it is significant to note that the release section 52a of the trigger 6 extends on opposite sides of the central portion of the trigger thus permitting the trap to be set for either side and released from either side. Like the slot release previously described, this extended top enables easy placement and release of the trigger.

Figure 5:
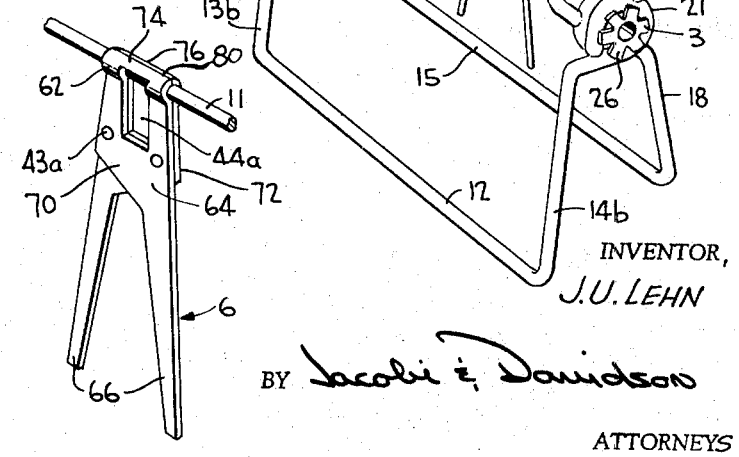
FIGURE 5 is a perspective view of a trigger mechanism in accordance with a third embodiment of this invention.

FIGURE 5 shows still a third embodiment of the trigger mechanism. In this embodiment trigger 6a comprises a sleeve portion 62 which fits around the side portion 11 of the jaw 1, a flat portion 64 projecting radially from the sleeve portion, and two flat trigger legs 66 projecting radially from the flat portion 64. Again, for convenience of manufacture and assembly, the sleeve portion 62, flat portion 64, and legs 66 are formed of two stamped plates 70 and 72 riveted together with fastening means, preferably rivets 43a. Each of the plates comprises half of the sleeve portion, with a flat portion extending radially downward tapering into one trigger leg member. As in the trigger shown in FIGURES 1 and 2, there is an elongate slot 44a in the flat portion 64 sufficiently deep to receive the latch 5, and extending into the sleeve portion 62 to a depth slightly greater than the radius of the sleeve.

The construction of the plates 70 and 72 to provide the slot 44a, and in particular the configuration of the upper portions 74 and 76 of the plates is of particular significance in FIGURE 5. The upper portion 74 of the plate 70 is cut-away about the side portion 11 so that in normal operation only the base thereof is exposed. In contrast, the upper portion 76 of the plate 72 is cut-away so that a substantial part of the side portion 11 is exposed. Thus, when the latch 5a engages the side portion 11, the trigger 6a is, as a whole, canted inwardly. By reference to FIGURE 6 it will be noted that the circumferential distance along the portion 74 from the point at which portions 74 and 76 meet at the seam 80 to the notch 44a is greater than the corresponding distance along the portion 76 indicating that the amount cut-away in the upper portion 74 of the plate 70 is less than the amount cut-away in the upper portion 76 of the plate 72. The plates 70 and 72 which form the trigger 6a are essentially rigid, and with this variation in the exposure of the side portion 11 provided by the differing degree of the notches in the upper portions 74 and 76, the legs 66 are disposed intermediate the outer confines of the trap or between the respective portions 12 and 15, for example, when the embodiment of FIGURES 5 and 6 is used on a complete trap as shown in FIGURE 2.

In contrast, with the other embodiments, the legs 42 are formed of wire and can be bent inwardly easily so as to be disposed generally centrally of the trap. Yet, if desired, the relative exposure of the side portion 11 by the particular notch or trigger element can be varied in the embodiments of FIGURES 1 through 4 such that the wire, when maintained straight, is disposed generally centrally of the trap.

As can be seen the latch mechanism 5, when released by the trigger mechanism 6 of any of the instant embodiments, will swing downwardly by the force of gravity and will enable the jaws of the trap to swing shut on whatever disturbed the trigger. The downward motion of the catch, as opposed to an upward swing in prior art animals traps, enables more efficient operation than with the prior art apparatus. The slot utilized in the trigger of all of the embodiments, except FIGURE 4, facilitates setting the trap, and the dual sided release of the embodiment of FIGURE 4 also facilitates setting the trap because of the ability to latch on either side of the central portion of the trigger.

In the drawings, the jaws are shown as being approximately square in shape with straight side portions and with a length approximately equal to the width of the jaws. The dimensions of the spring are such that it will swing into a flat position between the opposite sides of the jaws when in sprung position. However, the size and shape of the jaws can be varied, depending on the purpose for which the trap is intended.

Having now described illustrative and preferred embodiments of the present invention in sufficient detail to permit a complete understanding of the various aspects of the invention, it should be apparent to those reading this specification that the objects set forth at the outset hereof have been successfully achieved.

Accordingly,

What is claimed is:

Accordingly, what is claimed is:

1. An animal trap comprising two similar frames, each having opposite side portions and connecting end portions, pivot means pivotally connecting the end portions of said frames together intermediate said side portions, spring means for swinging said frames relative to one another about their pivots from a set position in which an upper side portion of one frame is adjacent an upper side portion of the other frame to a closed position in which said upper side portion of each frame is adjacent a lower side portion of the other frame, a latch member pivotally carried on said upper side portion of said one of said frames and comprising an arm having at least one upwardly opening notch spaced along the outer edge of said arm and adapted to receive said upper side portion of said other frame from below in said at least one notch to hold said frames in set position, and a trigger member pivotally carried on said upper side portion of the other frame and having a portion engaging said latch from above to release said other frame from said selected notch and thereby allow said latch member to swing downwardly and release said frames.

2. The trap of claim 1 wherein said opposite side portions constitute jaws of the trap and said connecting end portions are opposite end portions joining said side portions, each of said frames comprising two lengths of wire stock having one end of the end portions bent back on themselves to form eyes and the other end of the end portions being welded to said eyes to join said lengths together, said eyes being disposed at approximately the middles of the end portions of said frames and in a plane perpendicular to the general plane of said frame, the eyes of one frame being adjacent and registering to the corresponding eyes of the other frame, said pivot means are pivot pins extending through said registered eyes to connect said frames pivotally with one another for relative rotation from said open position of the trap to said closed position.

3. The trap of claim 2 wherein said trigger member comprises a sleeve portion pivotally carried on said upper side portion of said other frame, a flat portion projecting radially from said sleeve portion, a two-pronged trigger arm comprising a bent wire fixedly secured to said flat portion by fastening means, an elongate slot located in said flat portion extending radially from said sleeve portion and extending upwardly into said sleeve portion to a depth slightly greater than the radius of said sleeve portion, said elongate slot being of sufficient depth and width to accommodate said latch member.

4. The trap of claim 3 wherein said latch member contains from one to three notches spaced along the outer edge of said arm.

5. The trap of claim 4 wherein said latch member contains one notch on the outer edge of said arm.

6. The trap of claim 2 wherein said trigger member comprises a sleeve portion pivotally carried on said upper side portion of said other frame and a flat portion projecting radially from said sleeve portion, a two-pronged trigger arm comprising a bent wire fixed to said flat portion by fastening means, said sleeve portion extending axially at each end along the top of said upper side portion of said other frame for a distance greater than the thickness of said latch member, said axially extending portion of said sleeve portion being cut away to a depth slightly greater than the radius of said sleeve portion so that the upper portion of said axially extending portion of said sleeve portion will engage said latch member to release said other frame from said selected notch and thereby allow said latch member to swing downwardly and release said frames.

7. The trap of claim 6 wherein said latch member contains from one to three notches spaced along the outer edge of said arm.

8. The trap of claim 2 wherein said trigger member comprises a sleeve portion pivotally carried on said upper side portion of said other frame, a flat portion projecting radially from said sleeve portion and two flat legs projecting radially from said flat portion, said flat portion containing an elongate slot extending radially for a distance sufficient to accommodate said latch member and extending upwardly into said sleeve portion in such a manner that said legs hang downwardly and are disposed intermediate the outer confines of the trap when in the set position.

9. The trap of claim 8 wherein said latch member contains from one to three notches spaced along the outer edge of said arm.

10. The trap of claim 9 wherein said latch member contains three notches on the outer edge of said arm.

References Cited
UNITED STATES PATENTS

| | | | |
|---|---|---|---|
| 2,701,428 | 2/1955 | Mau | 43—90 |
| 2,894,353 | 7/1959 | Mau | 43—88 |
| 2,947,107 | 8/1960 | Lehn | 43—92 |
| 3,010,245 | 11/1961 | Conibear | 43—90 |
| 3,106,036 | 10/1963 | Lehn | 43—93 |
| 3,146,545 | 9/1964 | Frost | 43—90 |
| 3,335,517 | 8/1967 | Montgomery et al. | 43—92 |

WARNER H. CAMP, *Primary Examiner.*